United States Patent [19]

Hares et al.

[11] Patent Number: 5,270,269
[45] Date of Patent: Dec. 14, 1993

[54] LEAD-FREE FINE CRYSTAL GLASSWARE

[75] Inventors: George B. Hares, Corning; Roger A. Miller; Lisa A. Tietz, both of Painted Post, all of N.Y.

[73] Assignee: Corning Incorporated, Corning, N.Y.

[21] Appl. No.: 894,820

[22] Filed: Jun. 8, 1992

[51] Int. Cl.⁵ .................. C03C 3/078; C03C 3/085; C03C 3/087; C03C 3/093
[52] U.S. Cl. ............................ 501/72; 501/65; 501/67; 501/69; 501/70
[58] Field of Search .............. 501/72, 67, 70, 69, 501/65

[56] References Cited

U.S. PATENT DOCUMENTS

| | | | |
|---|---|---|---|
| 2,699,399 | 1/1955 | Armistead | 501/72 |
| 3,464,932 | 9/1969 | Connelly | 252/478 |
| 3,805,107 | 4/1974 | Boyd | 313/92 |
| 4,089,693 | 5/1978 | La Grouw | 106/52 |
| 4,277,286 | 7/1981 | Boyd | 106/52 |
| 4,734,388 | 3/1988 | Cameron | 501/64 |
| 4,830,990 | 5/1989 | Connelly | 501/64 |
| 5,108,960 | 4/1992 | Boek | 501/64 |

FOREIGN PATENT DOCUMENTS

| | | | |
|---|---|---|---|
| 0098648 | 1/1984 | | 501/72 |
| 0628104 | 8/1978 | U.S.S.R. | 501/72 |

Primary Examiner—Mark L. Bell
Assistant Examiner—Deborah Jones
Attorney, Agent, or Firm—Clinton S. Janes, Jr.

[57] ABSTRACT

This invention relates to fine glass crystal prepared from lead-free glass compositions. The glasses consist essentially, in weight percent, of

| | | | |
|---|---|---|---|
| $SiO_2$ | 54–64 | BaO | 8–13 |
| $Li_2O$ | 0–3 | SrO | 8–13 |
| $Na_2O$ | 0–6.5 | ZnO | 5.5–9 |
| $K_2O$ | 0–7 | BaO + SrO + ZnO | 22–33 |
| $Li_2O + Na_2O + K_2O$ | 8–15 | | | wherein at least two of $Li_2O$, $Na_2O$, and $K_2O$ are present and are present in essentially equimolar ratios.

4 Claims, No Drawings

LEAD-FREE FINE CRYSTAL GLASSWARE

BACKGROUND OF THE INVENTION

ASTM Designation C162-56 (Standard Definition of Terms Relating to Glass and Glass Products) defines crystal glass as "a colorless glass, highly transparent, frequently used for art or tableware". For centuries it has been thought that the presence of a substantial quantity of lead oxide was required in the composition of the finest crystal glassware. Hence, many of the fine crystal glassware compositions contain 24–30% by weight lead oxide in their formulations, with some glass compositions containing even greater amounts For example, crystal glassware marketed by Corning Incorporated, Corning, N.Y. under the trademark STEUBEN ® contains about 30% by weight PbO. In Europe, lead crystal glassware is required to contain at least 24% lead oxide. It has been conventional wisdom that the inclusion of lead oxide in the base glass formulation imparted such special qualities to the glass as brilliance, clarity, meltability, sonority (resonance), weight, and workability. Stated in another way, glasses demonstrating that combination of properties could not be produced in lead-free glass compositions.

One of the desirable attributes of fine lead crystal glass is the bell-like tone emitted when an article of such glass, such as a dinner plate, goblet, vase, bowl, etc., is struck on the rim thereof with an object such as a pencil or a piece of metal flatware, e.g., a knife, fork, or spoon. In bell technology this sound is characterized by a "strike" note followed by a resonant, prolonged "hum" note. The duration of the hum (or resonance) comprises a significant contribution to the overall beauty of the tone emitted The presence of lead in the glass formulation was assumed to account for the long duration of the resonant hum in fine crystal glass because ware fashioned from common soda-lime-silica glass exhibit very little, if any, resonance.

Another perceived hallmark of fine crystal glass is the weight thereof. In other words, the "heft" of a piece of glass indicates its richness. Therefore, crystal glasses generally have had densities of at least 2.7 grams/cm$^3$, with many fine lead-containing crystal glasses demonstrating densities of 2.8 grams/cm$^3$ and higher. STEUBEN ® glassware exhibits a density of about 3 grams/cm$^3$.

Although fine crystal glass is not required to display the same level of resistance to chemical attack as ware designed for use in scientific laboratories, at the very least it must not develop a hazy surface upon extended exposure to the ambient environment. In certain older lead-containing crystal glasses the surface deteriorated so extensively that it was subject to crazing and/or crizzling.

Yet another feature of fine lead crystal glassware, particularly in those instances where the glass is to be hand worked, as is the case with STEUBEN ® glassware, is the long working range of the glass before it becomes too viscous to shape. If, at that point the piece is not completely formed into a desired shape, it is reheated in a furnace until it again becomes workable and can be further shaped. During this reheating no surface crystallization can be tolerated. The optimum viscosity for shaping the ware is considered to be about 10$^5$ poises (10$^4$Pa.s). For STEUBEN ® glassware the temperature corresponding to that viscosity is about 790° C.

One recognized unfavorable characteristic of fine lead crystal glassware is the ease with which it can be scratched. One measure of the scratch resistance of a glass is the hardness of its surface. And the surface hardness of glasses containing high amounts of lead is invariably low. Moreover, a glass having a harder surface generally exhibits a more brilliant appearance than a glass of lower surface hardness; that brilliance enhancing the overall beauty of the glass.

Where a glass is to be used in tableware applications, it must resist attack by acids and alkalis present in foods with which it may come into contact. The toxicity of lead has been recognized for many years. In recent years there has been a movement to reduce/eliminate lead from all cookware and tableware Thus, the Federal Food and Drug Administration (FDA) has established maxima for lead release which food-contacting surfaces must not exceed, and some state statutes mandate the total absence of lead from food contacting surfaces Those circumstances have given rise to the production of lead-free enamels and glazes for use in coating and decorating food service ware such as are disclosed in U.S. Pat. No. 4,084,976 (Hinton), U.S. Pat. No. 4,224,074 (Nigrin), U.S. Pat. No. 4,282,035 (Nigrin), U.S. Pat. No. 4,285,731 (Nigrin), and U.S. Pat. No. 4,590,171 (Nigrin). The properties of those glasses, however, do not correspond to those demonstrated by fine crystal glass.

Therefore, whereas the release of lead from high quality crystal glass is very low, because of the current impetus to eliminate lead from any ware coming into contact with food, the primary objective of the present invention was to devise glass formulations free from lead, but which would exhibit all of the aesthetic, chemical, and physical properties inherent in fine lead crystal glasses.

Moreover, lead-containing products are considered to constitute hazardous waste materials, therefore requiring special and costly disposal means. While, unlike the disposal of lead-containing batteries and television receiver sets, this is no problem for the individual who owns lead crystal glassware, it is a major concern for the glass manufacturer who must dispose of the dross from the manufacturing process. Accordingly, another advantage flowing from the elimination of lead from the glass composition is the consequence that it minimizes landfill problems.

SUMMARY OF THE INVENTION

We accomplished that objective in silicate glasses containing at least two of the alkali metal oxides Li$_2$O, Na$_2$O, and K$_2$O in nearly equimolar ratios, BaO, SrO, and ZnO. In the preferred glasses all three alkali metal oxides will be present in essentially equimolar ratios The inclusion of all three alkali metal oxides in essentially equimolar proportions has a profound beneficial effect upon the sonority displayed by the glass. We have found the following compositions, expressed in terms of weight percent on the oxide basis, to be operable in achieving the desired objective:

| | | | |
|---|---|---|---|
| SiO$_2$ | 54–64 | BaO | 8–13 |
| Li$_2$O | 0–3 | SrO | 8–13 |
| Na$_2$O | 0–6.5 | ZnO | 5.5–9 |
| K$_2$O | 0–7 | BaO + SrO + ZnO | 22–33 |
| Li$_2$O + Na$_2$O + K$_2$O | 8–15 | | | wherein at least two of the three alkali metal oxides are included and are present in essentially equimolar ratios.

In the preferred compositions, all three of the alkali metal oxides are included, being present in essentially equimolar ratios, and the glasses consist essentially, expressed in terms of weight percent on the oxide basis of:

| | | | |
|---|---|---|---|
| SiO$_2$ | 58–61 | BaO | 9–12 |
| Li$_2$O | 0.75–2.5 | SrO | 9–12 |
| Na$_2$O | 2–5 | ZnO | 6–9 |
| K$_2$O | 2–7 | BaO + SrO + ZnO | 24–33 |
| Li$_2$O + Na$_2$O + K$_2$O | 9–13 | | |

Up to 5 percent total of such compatible metal oxides as Al$_2$O$_3$, B$_2$O$_3$, Bi$_2$O$_3$, CaO, MgO, TiO$_2$, and ZrO$_2$ in individual amounts not exceeding 3 percent may be included to modify the physical properties and/or the melting and working characteristics of the glasses. For example, Al$_2$O$_3$ and ZrO$_2$ are recognized in the glass art as useful adjuvants to improve the resistance of glasses to chemical attack. Those oxides tend to harden the glass, however, so additions thereof will be limited. Where deemed desirable, As$_2$O$_3$ and/or Sb$_2$O$_3$ may be included in the glass batch in conventional amounts to perform their customary fining action. In like manner, where a colored glass is desired, conventional glass coloring agents such as the transition metal oxides may be incorporated in the glass in usual amounts.

The inventive glasses exhibit densities of at least 2.75 grams/cm$^3$, with the preferred compositions having densities of at least 2.85 grams/cm$^3$.

PRIOR ART

The exclusion of lead has also received attention in an area of glass art other than food preparation and service, viz., in faceplates for television receiver tubes. Thus, the impingement of high velocity electrons with accompanying X-radiation upon PbO-containing glass faceplates results in the generation of a brownish discoloration therein. Accordingly, glass compositions have been developed which absorb X-radiations, but which are not subject to the browning phenomenon. The following patents are illustrative of those glasses.

U.S. Pat. No. 3,464,922 (Connelly et al.) discloses glasses consisting essentially, in weight percent, of 0–10% Na$_2$O and/or 0–13% K$_2$O, the total Na$_2$O+K$_2$O constituting 4–20%, 40–70% SiO$_2$, and an effective amount up to 20% SrO, the sum of Na$_2$O and/or K$_2$O+SrO+SiO$_2$, comprising at least 70% by weight of the total composition. The glass compositions may contain up to 20% BaO and/or up to 15% total of CaO+MgO+ZnO and/or up to 10% Al$_2$O$_3$ and/or ZrO$_2$. ZnO is nowhere referred to in the patent.

U.S. Pat. No. 3,805,107 (Boyd) describes PbO-free glass compositions for television receiver tube faceplates consisting essentially, in weight percent, of

| | | | |
|---|---|---|---|
| SiO$_2$ | 61–65 | Al$_2$O$_3$ | 1.5–3.5 |
| SrO | 10–13 | CaO + MgO | 2–4 |
| Li$_2$O | 0.2–0.8 | TiO$_2$ | 0.2–0.7 |
| K$_2$O | 7–10 | CeO$_2$ | 0.1–0.3 |
| Na$_2$O | 6–9 | As$_2$O$_3$ + Sb$_2$O$_3$ | 0.4–0.8 |

Again, ZnO is nowhere mentioned in the patent.

U.S. Pat. No. 4,089,693 (La Grouw et al.) is directed to PbO-free glass compositions for television picture tube faceplates consisting essentially, in weight percent, of

| | | | |
|---|---|---|---|
| SiO$_2$ | 54–69 | CeO$_2$ | 0.05–0.3 |
| Na$_2$O | 6–10 | BaO | 8–18 |
| K$_2$O | 5–10 | ZnO | 0–5 |
| Na$_2$O + K$_2$O | 14–20 | As$_2$O$_3$ | 0–0.3 |
| CaO | 0–4 | Sb$_2$O$_3$ | 0–3 |
| MgO | 0–2.5 | As$_2$O$_3$ + Sb$_2$O$_3$ | ≧0.3 |
| Al$_2$O$_3$ | 0–6 | ZrO$_2$ + ZnO + Sb$_2$O$_3$ | >3 |
| ZrO$_2$ | 0–6 | 2ZrO$_2$ + BaO + ZnO + 4Sb$_2$O$_3$ | >20 |
| Al$_2$O$_3$ + ZrO$_2$ | <6 | | |

SrO is nowhere mentioned.

U.S. Pat. No. 4,277,286 (Boyd et al.) is drawn to PbO-free glass compositions for television picture tube faceplates consisting essentially, in weight percent, of

| | | | |
|---|---|---|---|
| SiO$_2$ | 43–55 | ZrO$_2$ | 2–8 |
| Al$_2$O$_3$ | 0–4 | CeO$_2$ | 0.3–1 |
| ZnO | 5–12 | CaO | 0–5 |
| Li$_2$O | 0.5–3 | SrO | 2–14 |
| Na$_2$O | 4–8 | BaO | 10–20 |
| K$_2$O | 3–8 | CaO + SrO + BaO | 16–30 |
| Li$_2$O + Na$_2$O + K$_2$O | 10–18 | | |

The preferred BaO content (14–16%) is higher than the maximum employed in the subject inventive glasses; ZrO$_2$ is a required component, rather than an optional ingredient; and none of the working examples provided in the patent had a composition coming within the ranges of the instant inventive glasses.

U.S. Pat. No. 4,734,388 (Cameron et al.) is concerned with PbO-free glass compositions for television picture tube faceplates consisting essentially, in weight percent,

| | | | | | |
|---|---|---|---|---|---|
| SiO$_2$ | 60–63 | BaO | 5.5–8.5 | ZrO$_2$ + Al$_2$O$_3$ | 4–6.25 |
| Li$_2$O | 0.25–0.8 | CaO | 1.5–4.0 | Sb$_2$O$_3$ | 0.25–0.55 |
| Na$_2$O | 7.25–9.25 | TiO$_2$ | 0.25–0.75 | As$_2$O$_3$ | 0–0.25 |
| K$_2$O | 6–8.25 | ZrO$_2$ | 4–6.25 | Sb$_2$O$_3$ + As$_2$O$_3$ | 0.35–0.75 |
| SrO | 5.5–8.5 | Al$_2$O$_3$ | 0–<2 | CeO$_2$ | 0.15–0.5 |

ZnO comprises no part of the patented compositions.

U.S. Pat. No. 4,830,990 (Connelly) outlines PbO-free and ZnO-free glass compositions for projection cathode ray tube faceplates consisting essentially, in weight percent, of

| | | | |
|---|---|---|---|
| Li$_2$O | 0.75–3 | Li$_2$O + Na$_2$O + K$_2$O | 11–16 |
| Na$_2$O | 5–7 | CaO + SrO + BaO | 21.5–26 |
| K$_2$O | 5–7 | Al$_2$O$_3$ | 1–2 |
| SrO | 7.5–10 | ZrO$_2$ | 2–7 |
| BaO | 14–16 | SiO$_2$ | 55–60 |
| CaO | 0–3 | CeO$_2$ | 0.4–0.8 |

The glass compositions are stated explicitly to be free from ZnO.

U.S. Pat. No. 5,108,960 (Boek et al.) reports PbO-free and Li$_2$O-free glass compositions for cathode ray tube face-plates consisting essentially, in weight percent, of

| | | | | | |
|---|---|---|---|---|---|
| SiO$_2$ | 60–65 | CaO + MgO | 0–3 | ZnO | 1–8 |
| Al$_2$O$_3$ | 0–3 | SrO | 8–12 | CeO$_2$ | 0.1–1 |
| Na$_2$O | 6.5–8 | BaO | 8–12 | TiO$_2$ | 0.1–1 |
| K$_2$O | 6.5–10 | SrO + BaO | 16–21 | Sb$_2$O$_3$ | 0.1–1 |

The concentrations of Na$_2$O are generally higher than the maximum permitted in the present inventive glasses, the preferred levels of ZnO are below the minimum required in the instant inventive glasses, and Li$_2$O is absent from the glass compositions.

DESCRIPTION OF THE PREFERRED EMBODIMENTS

TABLE I records a group of glass compositions, expressed in terms of weight percent on the oxide basis, illustrating the compositional parameters of the present invention. The actual batch ingredients for preparing the glasses can comprise any materials, either oxides or other compounds, which, when melted together, will be transformed into the desired oxide in the proper proportions. For example, BaCO$_3$, and Na$_2$CO$_3$ can provide the source of BaO and Na$_2$O, respectively. Sb$_2$O$_3$ was included to perform its conventional function in glass melting as a fining agent.

The batch components were mixed together very thoroughly to assist in securing a homogeneous melt and that mixture was charged into platinum crucibles. The crucibles were moved into a furnace operating at about 1450° C. and the batches melted for about 3 hours. Thereafter, the melts were poured into steel molds to form rectangularly-shaped slabs of glass having dimensions of about 10"×4×0.5"(~25.4×10.16×1.27 cm) and those slabs were transferred immediately to an annealer operating at about 500° C.

Whereas the above description reflects laboratory melting and forming practice only, it must be appreciated that the compositions recited in Table I complying with the terms of the subject invention can be melted and formed in much larger quantities utilizing conventional commercial melting units and glass forming techniques.

Several commercially-available, essentially lead-free crystal glassware compositions are also provided in Table I, the analyses thereof in weight percent being tabulated under the company designations.

TABLE I

|  | Schott | Tiffany | Moser | Phillips | 1 | 2 | 3 |
|---|---|---|---|---|---|---|---|
| SiO$_2$ | 69.8 | 69.5 | 75.7 | 65.0 | 59.5 | 60.2 | 55.7 |
| Al$_2$O$_3$ | 1.32 | 0.134 | 0.169 | 1.0 | 1.0 | 1.0 | — |
| Li$_2$O | — | — | — | — | 1.7 | 3.0 | 1.7 |
| Na$_2$O | 12.4 | 10.7 | 7.9 | 12.0 | 3.6 | 6.5 | 4.2 |
| K$_2$O | 2.88 | 8.11 | 10.1 | 4.0 | 5.4 | — | 6.4 |
| MgO | — | — | — | 2.0 | — | — | — |
| CaO | 6.02 | 4.92 | 5.52 | 6.0 | — | — | — |
| SrO | 0.096 | — | — | — | 10.5 | 9.5 | 10.5 |
| BaO | 7.57 | 2.80 | — | 7.0 | 10.5 | 9.5 | 10.5 |
| ZnO | — | 1.75 | — | 2.0 | 7.5 | 7.5 | 7.5 |
| B$_2$O$_3$ | — | 1.50 | 0.309 | — | — | 2.5 | — |
| Sb$_2$O$_3$ | 0.35 | 0.982 | 0.542 | 0.9 | 0.3 | 0.3 | 0.4 |
| ZrO$_2$ | — | — | — | — | — | — | 3.0 |

|  | 4 | 5 | 6 | 7 | 8 | 9 |
|---|---|---|---|---|---|---|
| SiO$_2$ | 57.3 | 54.3 | 65.7 | 64.0 | 64.0 | 64.1 | 64.7 |
| Al$_2$O$_3$ | — | — | 1.0 | 1.0 | 1.0 | 2.0 | 1.0 |
| Li$_2$O | 1.7 | 1.7 | 1.0 | 1.0 | — | — | 2.0 |
| Na$_2$O | 3.6 | 3.6 | 10.5 | 9.7 | 4.2 | 7.6 | 4.2 |
| K$_2$O | 5.4 | 5.4 | — | — | 6.5 | 7.0 | 6.3 |
| MgO | — | — | — | — | — | — | 2.0 |
| CaO | — | — | — | — | — | — | 7.0 |
| SrO | 10.5 | 12.0 | 9.5 | 6.0 | 6.0 | 9.5 | 5.0 |
| BaO | 10.5 | 12.0 | 9.5 | 18.0 | 18.0 | 9.5 | 5.0 |
| ZnO | 7.5 | 7.5 | 2.5 | — | — | — | 2.5 |
| Sb$_2$O$_3$ | 0.4 | 0.4 | 0.3 | 0.3 | 0.3 | 0.3 | 0.3 |
| ZrO$_2$ | — | 1.0 | — | — | — | — | — |
| TiO$_2$ | 3.0 | 2.0 | — | — | — | — | — |

Table II reports the softening point (S.P.), annealing point (A.P.), and strain point (St.P) in °C., the linear coefficient of thermal expansion (Exp) over the temperature range of 25°-300° C. expressed in terms of X10$^{-7}$/°C., the density (Den) in grams/cm$^3$, and the refractive index ($n$D) as determined in accordance with measuring techniques conventional in the glass art.

The chemical durability of the glasses when contacted with acids, as defined in terms of weight loss (W.L.A.), was determined by immersing polished plates of known weight for 24 hours in an aqueous bath of 5% by weight HCl operating at 95° C. After withdrawal from the bath and drying, the plates were reweighed and the weight loss measured in terms of mg/cm$^2$.

The chemical durability of the glass when exposed to bases, as defined in terms of weight loss (W.L.B.), was determined by immersing plates of known weight for six hours in an aqueous bath of 5% by weight NaOH operating at 95° C. After withdrawal from the bath and drying, the plates are reweighed and the weight loss measured in terms of mg/cm$_2$.

The glasses were also subjected to the following weathering test, the results of which are recorded in Table III. The test involves exposing two pieces of each glass to 98% relative humidity/50° C. for 12 weeks. One of the pieces was washed in deionized water every two weeks. The other piece was examined biweekly, but was not washed until the end of the 12 weeks. The extent of weathering was rated from A (no visible damage) to E (excessive deposit). Inasmuch as the brilliance of a glass is, in part, a function of surface quality, excellent resistance to weathering is an important attribute of fine glass crystal. In Table III the following legends apply:

A=nothing visible with intense illumination
B=slight deposit visible only with intense illumination
C=much deposit visible only with intense illumination
D=deposit readily visible in ordinary lighting
E=excessive deposit; test terminated The properties exhibited by STEUBEN® glassware are included in Tables II and III for comparison purposes.

In Table III the testing of unwashed samples of Examples 6, 8, and 9 was terminated prior to the full 12 weeks because their resistance to weathering was visually very poor. Those samples were washed at their termination and that value is recorded in the column entitled "Washed".

In Table III the testing of washed samples of Examples 6, 8, and 9 was stopped before the end of the full 12 weeks. The weathering resistance value exhibited by the samples at the termination of the testing is reported in the column designating the expiration of the testing.

TABLE II

|  | Schott | Tiffany | Moser | Phillips | 1 | 2 | 3 | 4 |
|---|---|---|---|---|---|---|---|---|
| S.P. | 686 | 675 | 708 | 685 | 673 | 629 | 674 | 675 |
| A.P. | 506 | 500 | 513 | 505 | 493 | 477 | 497 | 505 |
| St.P | 464 | 459 | 468 | 480 | 452 | 442 | 457 | 465 |
| Exp | 94.6 | 101.8 | 93.4 | 101 | 87.2 | 85.9 | 91.4 | 87.4 |
| Den | 2.598 | 2.558 | 2.445 | 2.633 | 2.898 | 2.892 | 2.977 | 2.941 |
| n$_D$ | 1.552 | — | — | 1.529 | 1.545 | — | 1.566 | 1.571 |
| WLA | −0.052 | — | — | −0.031 | −0.107 | — | — | — |
| WLB | −0.760 | — | — | −0.70 | −1.36 | — | — | — |

|  | 5 | 6 | 7 | 8 | 9 | 10 | STEUBEN |
|---|---|---|---|---|---|---|---|
| S.P. | 673 | 654 | — | 725 | 688 | 677 | 583 |
| A.P. | 507 | 474 | — | 528 | 504 | 501 | 405 |
| St.P | 469 | 437 | — | 479 | 461 | 458 | 367 |
| Exp | 89.8 | 91.4 | 93.7 | 87.4 | 97.9 | 89.4 | 93 |

TABLE II-continued

| | | | | | | | |
|---|---|---|---|---|---|---|---|
| Den | 3.046 | 2.776 | 2.823 | 2.802 | 2.719 | 2.686 | 3.09 |
| $n_D$ | 1.575 | 1.534 | — | — | — | — | 1.57 |
| WLA | — | — | — | — | — | — | −0.136 |
| WLB | — | — | — | — | — | — | −1.94 |

TABLE III

| | Unwashed Samples | | | | | | | Washed Samples | | | | | |
|---|---|---|---|---|---|---|---|---|---|---|---|---|---|
| Example | Two Weeks | Four Weeks | Six Weeks | Eight Weeks | Ten Weeks | Twelve Weeks | Washed | Two Weeks | Four Weeks | Six Weeks | Eight Weeks | Ten Weeks | Twelve Weeks |
| Schott | E | E | E | E | E | E | D | C | C | D | D | D | D |
| Tiffany | E | E | E | E | E | E | D | A | C | C | C | C | C |
| Moser | B | D | D | D | D | D | C | A | C | C | C | C | C |
| Phillips | D | D | D | E | E | E | E | C | D | D | D | D | D |
| 1 | C | C | C | C | C | D | A | A | A | A | A | A | A |
| 6 | D | D | Test Stopped | | | | C | C | C | Test Stopped | | | |
| 7 | D | D | D | D | D | D | C | C | C | C | C | C | C |
| 8 | B | C | C | C | Test Stopped | | C | A | A | B | B | Test Stopped | |
| 9 | C | C | D | D | Test Stopped | | C | B | C | C | C | Test Stopped | |
| 10 | B | C | C | C | C | C | C | A | A | A | A | A | B |
| Steuben | B | C | C | C | D | D | B | A | A | A | A | A | A |

Examples 1–5 comprise glasses exhibiting chemical and physical properties desired in fine crystal glassware without the presence of lead, with Example 1 constituting the most preferred embodiment. Thus, those glasses demonstrate the "heft", i.e., the high density, desired, along with relatively low softening and annealing points, relatively good chemical durability, and excellent resistance to weathering. Those latter two properties are deemed to be inherent in Examples 2–5 because of the closeness of their compositions to Example 1.

As can be observed in Table II, Examples 1–5 are generally softer and of higher density than currently marketed lead-free crystal glassware. The feature comprising the greatest distinction between Examples 1–5 and the commercially marketed lead-free crystal glassware (and Examples 6–10 having compositions outside of the ranges found operable to yield glasses having the desired properties), however, is their much better resistance to weathering, as is illustrated in Table III.

As was noted above, glasses coming within the composition intervals of the present invention can be melted in large commercial units. In pilot runs Example was handworked, molded, and engraved following procedures customarily utilized with lead-containing crystal glassware. The workers reported that the glass behaved at least as well as, if not better than, lead-containing crystal glassware and did not crystallize upon reheating. Thus, although the temperature at $10^5$ poises ($10^4$Pa.s) was about 60° C. higher than that of STEUBEN ® glassware, that factor did not adversely affect the melting and forming processes. Vases and bowls hand fashioned from the glass exhibited a resonant bell-like tone comparable to that of STEUBEN ® glassware. In general, the present inventive glasses will exhibit viscosities of about $10^5$ poises ($10^4$Pa.s) at temperatures about 50°–125° C. higher than that of STEUBEN ® glassware.

A comparison of the chemical durability and weathering resistance of Example 1 with STEUBEN ® glassware is also of interest. Example 1 proved to be somewhat superior in both tests. Furthermore, the surface hardness of Example 1 is greater than that of STEUBEN ® glassware, as is evidenced by a Knoop hardness value (100 gram load) of 498 for Example 1 and 415 for STEUBEN ® glassware.

We claim:

1. A glass essentially free from lead which exhibits a density of at least 2.75 grams/cm$^3$, a bell-like tone when struck, a coefficient of thermal expansion ranging from 85.9–91.4 × 10$^{-7}$/°C., and excellent resistance to weathering consisting essentially, expressed in terms of weight percent on the oxide basis, of

| | | | |
|---|---|---|---|
| SiO$_2$ | 54–64 | BaO | 8–13 |
| Li$_2$O | 0–3 | SrO | 8–13 |
| Na$_2$O | 0–6.5 | ZnO | 5.5–9 |
| K$_2$O | 0–7 | BaO + SrO + ZnO | 22–33 |
| Li$_2$O + Na$_2$O + K$_2$O | 8–15 | | | wherein at least two of Li$_2$O, Na$_2$O and K$_2$O are present and are present in essentially equimolar ratios.

2. A glass according to claim 1 also containing up to 5% total of at least one metal oxide in an individual amount not exceeding 3% selected from the group consisting of Al$_2$O$_3$, B$_2$O$_3$, Bi$_2$O$_3$, CaO, MgO, TiO$_2$, and ZrO$_2$.

3. A glass according to claim 1 wherein said glass consists essentially of

| | | | |
|---|---|---|---|
| SiO$_2$ | 58–61 | BaO | 9–12 |
| Li$_2$O | 0.75–2.5 | SrO | 9–12 |
| Na$_2$O | 2–5 | ZnO | 6–9 |
| K$_2$O | 2–7 | BaO + SrO + ZnO | 24–33 |
| Li$_2$O + Na$_2$O + K$_2$O | 9–13 | | | wherein Li$_2$O, Na$_2$O, and K$_2$O are present in essentially equimolar ratios.

4. A glass according to claim 3 also containing up to 5% total of at least one metal oxide in an individual amount not exceeding 3% selected from the group consisting of Al$_2$O$_3$, B$_2$O$_3$, Bi$_2$O$_3$, CaO, MgO, TiO$_2$, and ZrO$_2$.

* * * * *